(12) United States Patent
Joshi et al.

(10) Patent No.: US 8,313,619 B2
(45) Date of Patent: Nov. 20, 2012

(54) ENHANCED GENERATION OF HYDROXYL RADICALS

(75) Inventors: Ashutosh Joshi, Kartaj (IN); Yuri Kolodny, Tel Aviv (IL); Itay Kreisel, Haifa (IL); Yoel Sasson, Jerusalem (IL)

(73) Assignees: Yissum Research Development Company of the Hebrew University of Jersualem, Jerusalem (IL); Arkal Filtration Systems C.S. Ltd, Hayarden (IL)

( * ) Notice: Subject to any disclaimer, the term of this patent is extended or adjusted under 35 U.S.C. 154(b) by 0 days.

(21) Appl. No.: 10/541,011

(22) PCT Filed: Dec. 29, 2003

(86) PCT No.: PCT/IL03/01112
§ 371 (c)(1),
(2), (4) Date: Dec. 20, 2005

(87) PCT Pub. No.: WO2004/060834
PCT Pub. Date: Jul. 22, 2004

(65) Prior Publication Data
US 2006/0144688 A1      Jul. 6, 2006

(30) Foreign Application Priority Data
Jan. 2, 2003   (IL) .......................................... 153792

(51) Int. Cl.
*C07C 1/00*   (2006.01)
*C01B 13/00*  (2006.01)
*C01B 3/00*   (2006.01)

(52) U.S. Cl. ............ 204/157.15; 204/157.5; 204/157.52
(58) Field of Classification Search ............. 204/157.15, 204/157.5, 157.52
See application file for complete search history.

(56) References Cited

U.S. PATENT DOCUMENTS

| | | | |
|---|---|---|---|
| 5,288,461 A | 2/1994 | Gray | |
| 5,733,869 A | 3/1998 | Burhop et al. | |
| 6,128,701 A | 10/2000 | Malcolm et al. | |
| 6,194,821 B1 * | 2/2001 | Nakamura | 313/238 |
| 6,361,697 B1 * | 3/2002 | Coury et al. | 210/759 |
| 6,793,903 B1 * | 9/2004 | Parrish | 423/400 |

FOREIGN PATENT DOCUMENTS

| | | | |
|---|---|---|---|
| CS | 274995 B2 * | 12/1991 | |
| DE | 51638 A * | 11/1966 | |
| FR | 2 303 766 A1 | 10/1976 | |
| JP | 10289219 | 10/1998 | |
| WO | WO 99/22315 | 5/1999 | |

OTHER PUBLICATIONS

English Translation of CS 274995 (Lederer et al.), Dec. 1991, pp. 1-9.*

(Continued)

*Primary Examiner* — Edna Wong
(74) *Attorney, Agent, or Firm* — Greenberg Traurig, LLP

(57) ABSTRACT

This invention provides a process for enhancing the generation of hydroxyl radicals in aqueous mixtures containing hydrogen peroxide, which process comprises supplying oxygen and magnesium oxide to the mixture and irradiating it with UV light. The process can be used, for example, for processing ballast water, industrial waste waters, and municipal waste waters.

12 Claims, 3 Drawing Sheets

OTHER PUBLICATIONS

Giamello et al., "Evidence of Stable Hydroxyl Radicals and Other Oxygen Radicals Species Generated by Interaction of Hydrogen Peroxide with Magnesium Oxide", J. Phys. Chem. (no month, 1993), vol. 97, pp. 5735-5740.*

Jen et al., "Determination of Hydroxyl Radicals in an Advanced Oxidation Process with Salicylic Acid Trapping and Liquid Chromatography", J. of Chrom. A, vol. 796 (no month, 1998), pp. 283-288.*

Zhou et al., "Determination of Photochemically Produced Hydroxyl Radicals in Seawater and Freshwater", Marine Chemistry (no month, 1990), vol. 30, pp. 71-88.*

Pankratov, A., Photodissociation of Water . . . Surface, Khimiya Vysokikh Energii, 1970, pp. 126-130, in Russian and a translation (7 pages).

International Search report for PCT/IL03/001112—2 pages, May 6, 2004.

International Preliminary Examination report for PCT/IL03/001112—5 pages which includes amended PCT claims, Mar. 18, 2005.

Pankratov, A., Photodissociation of Water . . . Surface, Khimiya Vysokikh Energii, 1970, pp. 126-130, and a 7 page English translation of the same.

European Search Report from European Patent Application No. 03 78 0598 dated Jun. 10, 2011.

Lunak, S. et al, "Photoinitiated reactions of hydrogen peroxide in the liquid phase", Journal of Photochemistry and Photobiology A:Chemistry; vol. 68, No. 1; Aug. 31, 1992; pp. 1-33.

Harmon, E. et al., "Oxidation of Starch by Hydrogen Peroxide in the Presence of UV Light—Part II", Die Stärke, vol. 24, No. 1, 1972, pp. 8-11.

* cited by examiner

| Run No | React. cond. | H$_2$O$_2$ (ppm) | MgO (ppm) | Conv. of SA in 90 min (%) | Conv. of SA in 20 min (%) |
|---|---|---|---|---|---|
| 1 | SA/UV | 0 | 0 | 8.42 | 5.8 |
| 2 | SA/UV/MgO | 0 | 20 | 10.51 | 6.12 |
| 3 | SA/UV/H$_2$O$_2$ | 10 | 0 | 11.56 | 6.64 |
| 4 | SA/UV/H$_2$O$_2$/MgO | 10 | 20 | 15.42 | 8.2 |
| 5 | SA/UV/O$_2$ | 0 | 0 | 15.08 | 5.9 |
| 6 | SA/UV/MgO/O$_2$ | 0 | 20 | 20.56 | 6.89 |
| 7 | SA/UV/H$_2$O$_2$/O$_2$ | 10 | 0 | 20.31 | 8.26 |
| 8 | SA/UV/H$_2$O$_2$/MgO/O$_2$ | 10 | 20 | 27.37 | 11.76 |

Fig. 3

ENHANCED GENERATION OF HYDROXYL RADICALS

FIELD OF THE INVENTION

The present invention relates to a method for enhancing the formation of hydroxyl radicals in water environment in the presence of hydrogen peroxide, by the combined effect of UV irradiation, dissolved oxygen, and magnesium oxide as a catalyst.

BACKGROUND OF THE INVENTION

Hydroxyl radical (HO*) is one of the strongest oxidants that is available in the natural world and in the chemist's tool box. This species is extremely reactive and degrades promptly any available organic molecule. Hydroxyl radicals, likewise other reactive oxygen species, are also a very potent biocide which vigorously attack microorganisms and tissues, damaging cell membrane lipids, proteins, carbohydrates and DNA. The hydroxyl radical reactions are extremely fast, having rate constants of from $10^7$ to $10^9$ $M^{-1}$ $sec^{-1}$. Consequently the hydroxyl radical only diffuses the equivalent of 5-10 of its molecular diameter before it reacts [E. Cadenas: Ann. Rev. Biochem. 58 (1989) 79]. Interestingly, hydroxyl radicals and other reactive/oxygen species were recently recognized as a cellular signaling device [E.g., Van Breusegem et al.: Plant Sci. 161 (2001)405-414], as well as a biological weapon used by the immune system for killing bacteria [Wentworth P. et al.: Science 298 (2002) 2195-9].

Hydroxyl radicals injure cell membrane lipids via the following chain mechanism:
a) Detachment of a hydrogen radical randomly from a fatty acid, leading to the formation of an alkyl radical:

$$RH + HO^* \rightarrow R^* + H_2O$$

b) The alkyl radical reacts instantly with oxygen (which is available in aerobic environment) to yield an alkylhydroperoxide derivative:

$$R^* + O_2 \rightarrow ROO^*$$

c) The alkyl hydroperoxide reacts with water to generate an alcohol and a hydroperoxyl radical:

$$ROO^* + H_2O \rightarrow ROH + HOO^*$$

The transformation of a fatty acid skeleton into an alcohol renders the destruction of the membrane structure and consequently the collapse of the cell wall and the death of the organism.
d) The hydroperoxyl radical absorbs a hydrogen radical from another fatty acid molecule to yield an alkyl radical that subsequently reacts with oxygen, as shown in step b):

$$RH + HOO^* \rightarrow R^* + H_2O_2$$

The hydrogen peroxide formed becomes the source of additional hydroxyl radicals which renew the cycle. This chain process propagates until a termination step such as the following one takes place:

$$2ROO^* \rightarrow \text{non-radical oxygenated products.}$$

A fundamental feature of hydroxyl radicals (and other reactive oxygen species) is the benign nature of their decomposition products. No chemicals are formed as a result of their application in various water treatments but water.

Several methods for the generation of hydroxyl radicals are known, based mainly on hydrogen peroxide as the source. The simplest and the most accepted methodology is based on the Fenton reaction where ferrous ion reacts with hydrogen peroxide in an acidic media as follows [Legrini O.: Chem. Rev. 93 (1993) 671-98]:

$$Fe^{+2} + H_2O_2 \rightarrow Fe^{+3} + HO^* + OH^-$$

This reaction is made catalytic predominantly under the effect of UV irradiation of the wavelength greater than 300 nm, which allows the recycling of $Fe^{+3}$ to the original $Fe^{+2}$, which process is named "Photo-Fenton" reaction. The main drawback of the Fenton type procedures is their strong dependence on pH. Thus the above reaction occurs only under acidic conditions, preferably at pH=2.5-3.0.[Andreozzi R. et al.: Catalysis Today 53 (1999) 51-9]. Consequently the Fenton scheme is not practicable under the numerous situations where acidic media cannot be used, such as in ballast water treatment, for example.

Another procedure for the formation of hydroxyl, and hydroperoxyl, radicals uses photocatalysis together with semi-conductors such as $TiO_2$. Upon irradiation of $TiO_2$ particle by the light having wavelength about 315-395 nm, an electron is ejected, generating a "hole" on the particle surface:

$$TiO_2 + h\nu \rightarrow TiO_2(h^+) + e^-$$

The "hole" interacts with water to produce a hydroxyl radical:

$$TiO_2(h^+) + H_2O \rightarrow TiO_2 + HO^* + H^+$$

The free electron reacts with oxygen molecule to produce an anion of superoxide radical which is protonated to yield a hydroperoxyl radical:

$$e^- + O_2 \rightarrow O_2^{-*}$$

$$O_2^{-*} + H^+ \rightarrow HOO^*$$

Another widespread technique for the making of hydroxyl radical is direct photolysis of hydrogen peroxide under UV irradiation:

$$H_2O_2 + h\nu \rightarrow 2\ HO^*$$

This procedure suffers from low efficacy due to the very low molar extinction coefficient of the hydrogen peroxide molecule (about 19 $dm^3.mol^{-1}.cm^{-1}$ at 254 nm at neutral pH [Baxendale J. H. .: Trans. Faraday Soc. 53 (1957) 344].

Using EPR techniques, Giamello E. et al. [J. Phys. Chem. 97(1993) 5735-40] showed that reactive oxygen species were formed upon contact of hydrogen peroxide with the surface of magnesium oxide in an aqueous environment. These authors also observed a highly unexpected stability of hydroxyl radicals adsorbed on the MgO surface, wherein the radicals were stable at temperatures as high as 200° C.

It is an object of this invention to provide a high efficacy method for producing hydroxyl radicals in aqueous environment using UV irradiation of hydrogen peroxide solutions.

It is another object of this invention to provide a method for producing hydroxyl radicals in water solutions of hydrogen peroxide and oxygen, combining UV irradiation with a catalytic effect of magnesium oxide.

Other objects and advantages of present invention will appear as description proceeds.

SUMMARY OF THE INVENTION

This invention provides a method for enhancing the generation of hydroxyl radicals in aqueous mixtures containing hydrogen peroxide comprising: i) supplying oxygen or air to said mixture; ii) supplying magnesium oxide to said mixture; iii) irradiating said mixture with UV light, preferably having a wavelength of from 190 to 390 nm; and iv) mixing said mixture. Said aqueous mixture is an aqueous solution or suspension. The initial concentration of hydrogen peroxide is from 2 ppm to 250 ppm, preferably 10 ppm to 50 ppm. Magnesium oxide is preferably added to the mixture in one portion of from 2 ppm to 250 ppm, and more preferably from 10 ppm to 50 ppm. Oxygen is supplied as air or pure oxygen, preferably to saturation.

BRIEF DESCRIPTION OF THE DRAWINGS

The above and other characteristics and advantages of the invention will be more readily apparent through the following examples, and with reference to the appended drawings, wherein:

FIG. 3. is a table summarizing conversion rates of salicylic acid under various conditions.

DETAILED DESCRIPTION OF THE INVENTION

Figure 1:
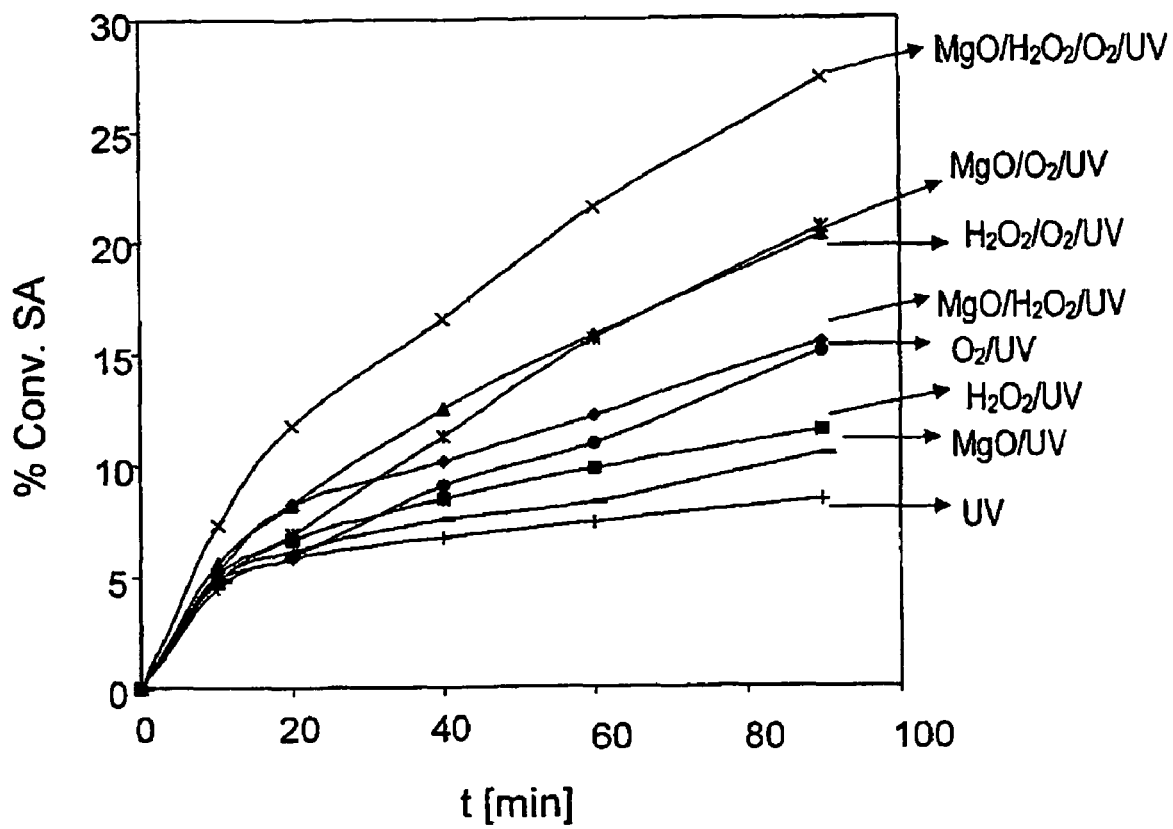
FIG. 1. Shows the effect of individual factors on the formation of hydroxyl radicals.

It has now been surprisingly found that the presence of magnesium oxide in an aqueous mixture containing hydrogen peroxide and oxygen leads to enhanced formation of hydroxyl radicals under UV irradiation. Without wishing to be limited by any particular theory, the inventors believe that magnesium oxide is a strong catalyst during the creation of hydroxyl radicals in water environment provided the system is irradiated by a UV light. This phenomenon provides particularly good results in the presence of oxygen. The synergic combination of hydrogen peroxide, oxygen, magnesium oxide and UV irradiation provides an effective new means for the generation of hydroxyl radicals in water. Surprisingly, even in the absence of hydrogen peroxide, a significant amount of hydroxyl radicals are formed in water in the presence of oxygen and magnesium oxide. In a preferred embodiment of the present invention, hydrogen peroxide is added to an aqueous solution in which the formation of hydroxyl radicals is desired, and magnesium oxide is injected as a suspension while mixing the aqueous solution, introducing into it oxygen, and irradiating it by UV. Any commercially available UV irradiation source can be used.

In a preferred embodiment of the method according to this invention, the initial concentration of hydrogen peroxide is from 2 ppm to 250 ppm, the solution is saturated with oxygen, and magnesium oxide in suspension is injected as a catalyst to a concentration from 2 ppm to 250 ppm. Oxygen is preferably introduced into the mixture by injection of oxygen or air.

In one of the preferred embodiments of the invention, the peroxide radicals serve for the treatment of ballast water. In a preferred embodiment of this invention, hydrogen peroxide is added to sea water, intended to serve as ballast water, to a concentration of from 10 to 50 ppm, air or oxygen is finely dispersed to saturate the mixture, and magnesium oxide is added to a concentration of from 10 ppm to 50 ppm.

This invention thus provides a method for enhancing the generation of hydroxyl radicals in aqueous mixtures containing hydrogen peroxide comprising i) supplying oxygen to said mixture; ii) supplying magnesium oxide to said mixture; iii) irradiating said mixture with UV light; and iv) mixing said mixture for a period sufficient to generate the desired amount of radicals, wherein said desired amount of radicals may be an amount sufficient to reach a required effect in the mixture, for example a biocidal effect. Said desired amount of radicals may be a required predetermined quantity. Hydroxyl radicals may be quantified by physical or chemical methods known in the art, such as measuring redox potentials, or reacting hydroxyl radicals with a trapping agent such as salicylic acid, etc. Said aqueous mixture can be a solution or suspension. Air or oxygen is supplied in any suitable manner that can inject and homogenize it into the aqueous solution, preferably providing saturation. According to a preferred embodiment of the invention the UV radiation has a wavelength of from 190 to 390 nm. Magnesium oxide is preferably added to the mixture in one portion. The period that enables the generation of required amount of radicals depends on the type of application of said mixture, and may be typically from few seconds to several hours, for example from 3 seconds to 5 hours, and preferably it is from 30 seconds to 100 minutes. The mixture may be irradiated essentially during the whole period that is set for the generation of hydroxyl radicals, and also oxygen may be supplied to the mixture during the whole of said period, or, alternatively, the application of UV and supplying oxygen may last only a few seconds, if the required effect is attained that quickly in said type of application.

In a preferred embodiment of this invention, the pH of the aqueous solution, in which the formation of hydroxyl radicals is desired, has a value of from 5 to 10, and preferably from 7.2 to 9.7.

The described process can be used whenever the increased concentration of hydroxyl radicals is desirable, an example being processing ballast water, industrial waste waters, municipal waste waters, etc. The method of this invention may be thus used, for example, for the purification of sea water or municipal effluent water, however without being limited to these examples.

The invention will be further described and illustrated by the following examples.

EXAMPLES

Quantifying Hydroxyl Radicals

Figure 2:
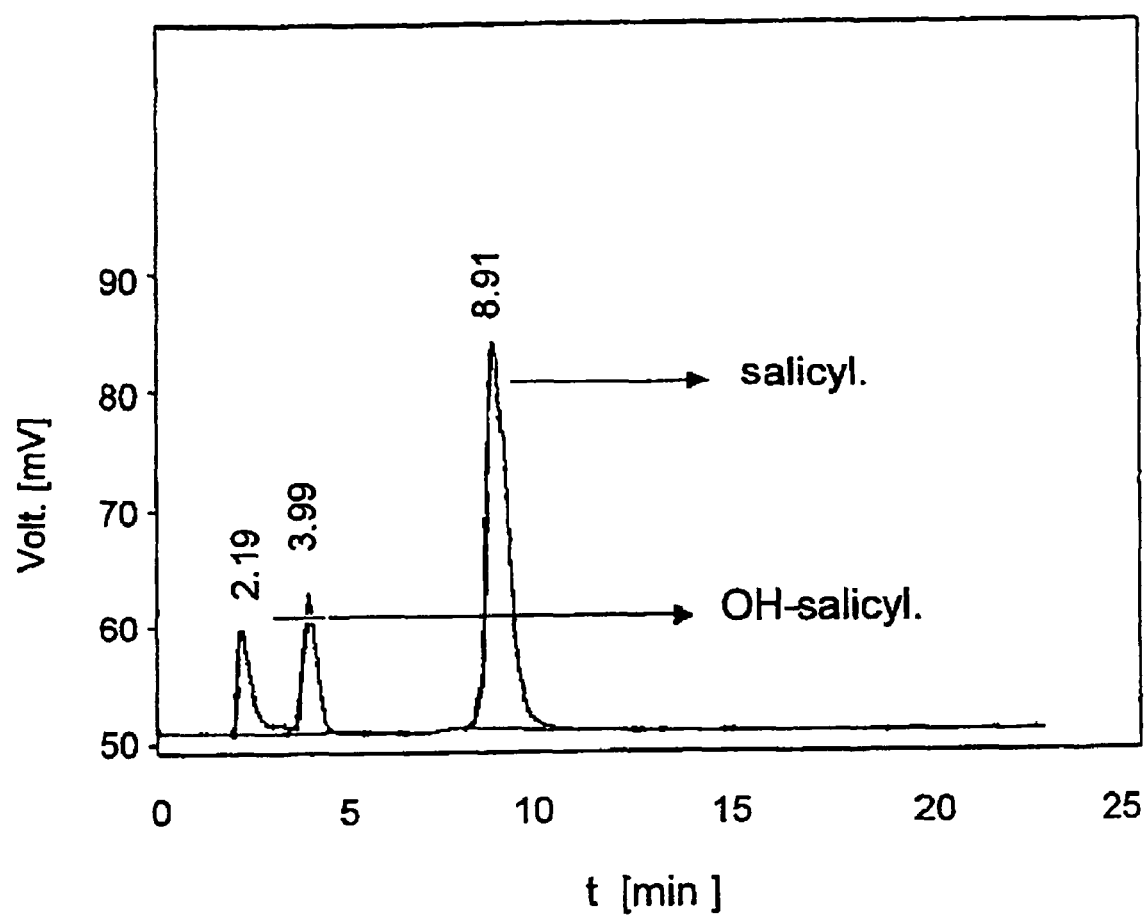
FIG. 2. is a HPLC chromatogram of salicylic and hydroxysalicylic acid.

The formation of hydroxyl radicals was quantified by reacting the radicals with salicylic acid [H. Kaur et al. : Methods in Enzymology 233 (1994) 67-82] to form 2,3-dihydroxybenzoic acid and 2,5-dihydroxybenzoic acid, and by detecting these products by HPLC with a UV detector (See FIG. 2), using column RP-18, 80% phosphate buffer pH 6.5+20% methanol, flow rate 1 ml/min, and $\lambda_{max}$ 300 nm.

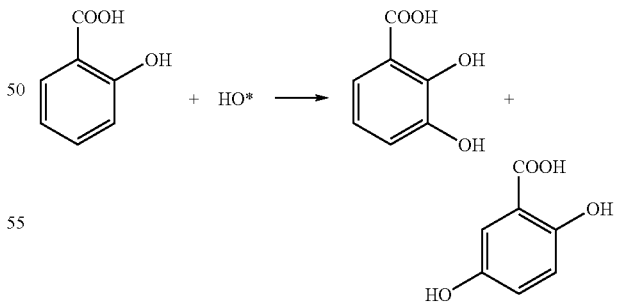

The degree and rate of the conversion to dihydroxybenzoic acid is proportional to the amount of hydroxyl radicals generated in a given system.

Example 1

Reaction was carried out in a one liter beaker equipped with a stirrer, into which a medium pressure mercury UV lamp in a quartz sleeve, Immersion Lamp TQ 150W, was immersed. Approximately half the lamp was immersed. Tap water passed continuously through quartz jacket to cool it. The total volume of reaction mixture was 800 ml. Illuminated length was 41 mm. Salicylic acid (Fluka, purity>99.5%), 500 ppm in 400 ml seawater, and 400 ml seawater were stirred with a magnetic stirrer, and the pH of the solution was adjusted to 7.85 with 0.5% NaOH. The irradiation continued for 90 min. Samples were withdrawn at 10, 20, 40, 60 and 90 min, and analyzed by HPLC. The conversion rates were calculated as the ratio of (OH-salicyl.)/(salicyl.+OH-salicyl.) (see FIGS. 1, 2, and 3).

Example 2

The reaction was started as in Example 1, but 20 ppm (16 mg) of magnesium oxide (obtained from Aldrich, purity 98%) was added to 800 ml of the reaction mixture after the pH adjustment, and after 5 min the irradiation started, and continued for 90 min.

Example 3

The reaction was started as in Example 1, but hydrogen peroxide, 20 ppm in 400 ml seawater, was added to salicylic acid, 500 ppm in 400 ml sea water, pH was adjusted to 7.85 with 0.5% NaOH, and the mixture was then irradiated during 90 min.

Example 4

The reaction was started as in Example 3, but 20 ppm (16 mg) of magnesium oxide was added to 800 ml of the reaction mixture after the pH adjustment, and only then the irradiation started.

Example 5

The reaction was started as in Example 1, but after the pH adjustment, purging of the mixture started, oxygen being fed at a rate of 50 ml/min through a glass tube of diameter 0.5 cm. After 10 min, the irradiation started, and continued for 90 min.

Example 6

The reaction was started as in Example 2, but after the addition of magnesium oxide, and 5 min stirring, purging of the mixture with oxygen started, oxygen being introduced through a glass tube of diameter 0.5 cm. After 10 min, the irradiation started, and continued for 90 min.

Example 7

The reaction was started as in Example 3, but after the pH adjustment, the mixture was purged with oxygen which was introduced through a glass tube of diameter 0.5 cm. After 10 min, the irradiation started, and continued for 90 min.

Example 8

The reaction was started as in Example 4, but after adding magnesium oxide and 5 min stirring, purging of the mixture with oxygen started, oxygen being introduced through a glass tube of diameter 0.5 cm. After 10 min, the irradiation started, and continued for 90 min. The pH at 90 min was 7.91. The initial and final temperature of the reaction mixture were 23° C. and 25.5° C., respectively, and the initial and final redox potential of the reaction mixture were 180 mV and 110 mV, respectively. The superior generation of hydroxyl radicals in the system $MgO/H_2O_2/O_2$ can be seen in FIGS. 1 and 3.

Example 9

Some of the enhanced activity, seen in the mixtures containing MgO, might be attributed to the increased basicity in the presence of solid MgO. Therefore, two reactions were performed comparing the effect of MgO with the effect of sodium hydroxide. Two mixtures contained 250 ppm salicylic acid, 30 ppm hydrogen peroxide, and they were irradiated by UV. The first mixture further contained 250 ppm MgO, its pH was adjusted to 7.8 at the beginning of the reaction, and rose to 9.38 after 90 minutes. The second mixture did not contain MgO and its initial pH was adjusted to 9.55 by NaOH. Magnesium oxide had stronger effect even when compared to the effect of sodium hydroxide, pH 9.55, which further demonstrates the phenomenon of catalytic properties of MgO.

While the invention has been described using some specific examples, many modifications and variations are possible. It is therefore understood that the invention is not intended to be limited in any way, other than by the scope of the appended claims.

The invention claimed is:
1. A method comprising:
 i) injecting oxygen ($O_2$) or air to a liquid aqueous biocidal mixture containing hydrogen peroxide ($H_2O_2$) at an initial concentration of from 2 to 250 ppm;
 ii) supplying a suspension of magnesium oxide to the hydrogen peroxide containing mixture and adjusting a pH of the mixture containing hydrogen peroxide and magnesium oxide to a value of from 7.2 to 9.7, the magnesium oxide concentration within the mixture being from 2 ppm to 250 ppm; and
 iii) generating an increase in hydroxy radicals ($OH^-$) by irradiating the mixture containing hydrogen peroxide and magnesium oxide with UV light having a wavelength of from 190 to 390 nm;
 wherein the increase in hydroxyl radicals ($OH^-$) is characterized by at least a two fold increase in percentage (%) of salicylic acid (SA) conversion as compared to % conversion of SA conversion as a result of treatment with UV only.
2. The method of claim 1, wherein the oxygen is injected to the liquid aqueous biocidal mixture to saturation.
3. The method of claim 1, wherein the initial concentration of hydrogen peroxide in the liquid aqueous biocidal mixture is from 10 ppm to 50 ppm, and the concentration of magnesium oxide in the mixture is from 10 to 50 ppm.
4. The method of claim 1, wherein the mixture is mixed after supplying the magnesium oxide, the mixing is for a period of time sufficient to generate a desired amount of hydroxyl radicals.
5. The method of claim 4, wherein the desired amount of hydroxyl radicals is sufficient to achieve a biocidal effect in the mixture.
6. The method of claim 4, wherein said period of time is from 3 seconds to 5 hours.
7. The method of claim 6, wherein said period of time is from 30 second to 100 minutes.
8. The method of claim 4, wherein said period of time is more than 5 hours.

9. The method of claim 4, wherein the desired amount of hydroxyl radicals generated in the mixture is a predetermined quantity.

10. The method of claim 4, further comprising quantification of the desired amount of hydroxyl radicals, the quantification comprising reacting the hydroxyl radicals, if present in the mixture, with salicylic acid.

11. The method of claim 1, wherein the liquid aqueous biocidal mixture is water selected from the group consisting of sea water and municipal effluent water.

12. The method of claim 1, wherein the method is performed in a single reaction vessel.

* * * * *